(12) United States Patent
Rizzo et al.

(10) Patent No.: US 8,583,840 B1
(45) Date of Patent: Nov. 12, 2013

(54) METHODS AND STRUCTURE FOR DETERMINING MAPPING INFORMATION INCONSISTENCIES IN I/O REQUESTS GENERATED FOR FAST PATH CIRCUITS OF A STORAGE CONTROLLER

(75) Inventors: James A. Rizzo, Austin, TX (US); Robert L. Sheffield, Jr., Longmont, CO (US); Rajeev Srinivasa Murthy, Bangalore (IN); Naveen Krishnamurthy, Bangalore (IN)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/455,826

(22) Filed: Apr. 25, 2012

(51) Int. Cl.
*G06F 3/00* (2006.01)
*G06F 12/00* (2006.01)

(52) U.S. Cl.
USPC .......... 710/38; 710/16; 710/17; 710/18; 710/19; 709/250; 709/251; 709/252; 711/4; 711/114

(58) Field of Classification Search
USPC ............ 710/16–19, 38; 709/250–252; 711/4, 711/114
See application file for complete search history.

(56) References Cited

U.S. PATENT DOCUMENTS

| | | | |
|---|---|---|---|
| 6,487,646 B1 | 11/2002 | Adams et al. | |
| 6,651,154 B1 | 11/2003 | Burton et al. | |
| 6,738,872 B2 | 5/2004 | Van Huben et al. | |
| 6,754,739 B1 | 6/2004 | Kessler et al. | |
| 6,944,785 B2 | 9/2005 | Gadir et al. | |
| 7,058,846 B1 | 6/2006 | Kelkar et al. | |
| 7,213,102 B2 | 5/2007 | Buchana, Jr. et al. | |
| 7,418,550 B2 | 8/2008 | Hetrick et al. | |
| 7,480,941 B1 | 1/2009 | Balasubramaniam et al. | |
| 7,814,065 B2 | 10/2010 | Chan et al. | |
| 7,971,094 B1 | 6/2011 | Benn et al. | |
| 8,041,735 B1 | 10/2011 | Lacapra et al. | |
| 8,190,816 B2 * | 5/2012 | Balasubramanian et al. | 711/114 |
| 8,261,003 B2 * | 9/2012 | Young et al. ................ | 711/4 |
| 2002/0103964 A1 | 8/2002 | Igari | |
| 2005/0097324 A1 | 5/2005 | Mizuno | |
| 2005/0125557 A1 | 6/2005 | Vasudevan et al. | |
| 2005/0188421 A1 | 8/2005 | Arbajian | |
| 2005/0240928 A1 | 10/2005 | Brown et al. | |
| 2007/0015589 A1 | 1/2007 | Shimizu | |

(Continued)

OTHER PUBLICATIONS

"Common RAID Disk Data Format Specification" Version 2.0 Revision 19 SNIA Technical Position Mar. 27, 2009.

(Continued)

*Primary Examiner* — Tammara Peyton
(74) *Attorney, Agent, or Firm* — Duft Bornsen & Fettig LLP; Gregory T. Fettig

(57) ABSTRACT

Methods and structure are disclosed for improved processing of fast path I/O requests in a storage controller utilizing version information embedded in the fast path I/O requests. The version information allows the storage controller to determine if the mapping information utilized by the host system in generating a fast path I/O request specifies the mapping information utilized by the storage controller. The controller comprises a fast path I/O request processing circuit tightly coupled with host system drivers for fast processing of requests directed to storage devices of a logical volume. The controller also comprises a logical volume I/O processing software stack for processing I/O requests from a host system directed to a logical volume. If the mapping information utilized by the host does not match the mapping information utilized by the storage controller, fast path I/O requests are transferred to the I/O request processing stack for subsequent processing.

19 Claims, 4 Drawing Sheets

(56) References Cited

U.S. PATENT DOCUMENTS

| | | |
|---|---|---|
| 2007/0067497 A1* | 3/2007 | Craft et al. .................. 709/250 |
| 2007/0210162 A1 | 9/2007 | Keen et al. |
| 2009/0119364 A1 | 5/2009 | Guillon |
| 2009/0222500 A1 | 9/2009 | Chiu et al. |
| 2010/0185874 A1 | 7/2010 | Robles et al. |
| 2010/0191873 A1 | 7/2010 | Diamant |
| 2010/0274977 A1 | 10/2010 | Schnapp et al. |
| 2011/0178983 A1 | 7/2011 | Bernhard et al. |
| 2011/0225371 A1 | 9/2011 | Spry |
| 2012/0159646 A1 | 6/2012 | Hong Chi et al. |
| 2012/0216299 A1 | 8/2012 | Frank |

OTHER PUBLICATIONS

Ciciani et al. "Analysis of Replication in Distributed Database Systems" IEEE Transactions on Knowledge and Data Engineering, vol. 2 . No. 2 . Jun. 1990.

\* cited by examiner

METHODS AND STRUCTURE FOR DETERMINING MAPPING INFORMATION INCONSISTENCIES IN I/O REQUESTS GENERATED FOR FAST PATH CIRCUITS OF A STORAGE CONTROLLER

BACKGROUND

1. Field of the Invention

The invention relates generally to storage systems and more specifically relates to methods and structure for direct pass through of "fast path" I/O requests in a storage system.

2. Related Patents

This patent is related to commonly owned, co-pending U.S. patent application Ser. No. 13/432,213, filed 28 Mar. 2012, and entitled "METHODS AND STRUCTURE FOR IMPROVED PROCESSING OF I/O REQUESTS IN FAST PATH CIRCUITS OF A STORAGE CONTROLLER IN A CLUSTERED STORAGE SYSTEM" which is hereby incorporated by reference.

3. Discussion of Related Art

In the field of data storage, customers demand high performance as well as highly resilient data storage systems that also exhibit fast recovery times for stored data. In general, Redundant Arrays of Independent Drives (RAID) storage systems are common to provide both enhanced performance and reliability. Performance is enhanced by "striping". Striping distributes blocks of data and associated redundancy information over a plurality of drives so that a read or write operation is more rapidly completed by parallel operation of the plurality of disk drives. Reliability is enhanced by the addition of redundancy information (e.g., XOR parity blocks such as in RAID level 5 management).

Such RAID storage management requires some logical to physical mapping capability in that a RAID logical volume—with striping and/or redundancy information—is presented to a host system as a single logical device having improved performance and reliability as compared to any single disk drive. RAID storage management within a RAID storage controller then maps the logical addresses associated with the logical volume into corresponding physical storage locations of one or more physical devices (i.e., disk drives) of the logical volume that are affected by the request.

Some storage systems provide storage controllers tightly coupled with corresponding drivers in attached host systems (e.g., where the storage controller is a host bus adapter "HBA" within the host system). In some such controllers, the storage controller provides multiple types of interface capabilities (i.e., multiple APIs to the host system). A standard interface (e.g., a first interface API) may be provided to the host system wherein the driver constructs an I/O request directed to a logical volume (e.g., directed to a RAID logical volume). The I/O request addresses logical block addresses of the logical volume. The storage controller then uses a mapping structure within the controller to map the I/O request to corresponding physical storage locations on the one or more storage devices that comprise the logical volume. For these requests, the storage controller also manages all related redundancy computations and management of associated redundancy information (i.e., for RAID logical volumes). The storage controller also manages computations related to mapping from logical addresses of the identified logical volume to physical addresses or affected storage devices.

Although these storage controllers can provide significant computational power to perform the requisite logical to physical mapping and any required redundancy computations, it is often the case that the host systems possess significantly more computational resources and power than do any of the multiple storage controllers of the storage system. Thus, in such tightly coupled driver-controller configurations, the storage controller may also provide an optional bypass mechanism (e.g., a second interface API) that directs I/O requests to a special purpose circuit of the storage controller optimized for rapidly performing lower level I/O operations directly on the individual physical storage device. In such a structure, the driver software on an attached host system may perform the logical to physical mapping computations and may also provide the redundancy computations to help manage associated redundancy information. For example, in some LSI Corporation storage controllers such a bypass mechanism is referred to as a "fast path" interface. In these controllers, the "fast path" driver software of the attached host system constructs I/O requests destined directly to the relevant physical locations of the physical storage devices that comprise the logical volume. The special purpose "fast path" processor circuit of the storage controller then performs the physical I/O operations as directed by the enhanced driver software of the host system.

The storage controller providing such a "fast path" option provides the driver software with essentially the same mapping information that the storage controller uses for mapping logical addresses of a logical volume to physical addresses of the storage devices of the volume. Fast path enabled LSI storage controllers and circuits generally implement the "fast path" as a custom designed circuit that can process the driver's I/O requests to physical storage devices very quickly (since the controller need not perform the mapping and RAID redundancy computations).

Problems arise, however, when the mapping information that the host driver uses does not correspond to the mapping information that the controller uses. For example, the controller may update the mapping information when a storage device of the logical volume fails, is removed from the logical volume, etc. When the mapping information at the controller changes, the mapping information in the driver software of attached host systems is eventually updated by the corresponding attached storage controller to specify the storage controller. However, it is a problem if the driver has already issued a number of "fast path" requests after the storage controller has updated the mapping information, but prior to receiving an update of the mapping information. Further, the driver software of a host system may continue to issue requests (via the "fast path" to the storage controller) before receiving its update of the mapping structures. These problems are further exacerbated when a storage controller is a component of a clustered storage system in which multiple storage controllers and multiple associated host systems all require synchronization of their respective mapping information to enable "fast path" I/O request generation and processing.

Thus it is an ongoing challenge to rapidly determine and recover from mapping information inconsistencies between a host system and the storage controller when the host system uses stale or outdated mapping information when generating fast path I/O requests.

SUMMARY

The present invention solves the above and other problems, thereby advancing the state of the useful arts, by providing methods and structure for improved processing of fast path I/O requests in a storage controller by utilizing version information embedded in the fast path requests. The version information allows the storage controller to determine if the mapping information utilized by the host system in generating the fast path I/O requests for storage devices specifies the mapping information utilized by the storage controller in generating I/O operations for the storage devices. The controller comprises a fast path I/O request processing circuit tightly coupled with host system drivers for fast processing of requests directed to storage devices of a logical volume. The controller also comprises a logical volume I/O processing software stack for processing I/O requests from a host system directed to a logical volume. If the mapping information utilized by the host in generating the fast path I/O requests specifies an older version of the mapping information than that which is presently utilized by the storage controller, the fast path I/O requests are transferred to the I/O request processing stack for subsequent processing.

In one aspect hereof, a method is provided that is operable in a storage controller comprising a logical volume I/O request processing stack implemented as software executed by the storage controller and further comprising a fast path I/O request processing circuit. According to the method, a fast path I/O request is received by the storage controller. The request is directed to a device identified by a device identifier in the I/O request. The request also includes an embedded version identifier that specifies a version of logical to physical mapping information utilized by the host system in generating the fast path I/O request for the device. A determination is made whether the version identifier in the fast path I/O request specifies a version of logical to physical mapping information utilized by the logical volume I/O request processing stack for generating I/O operations for the device. If the version identifier specifies the version of the logical to physical mapping information utilized by the I/O request processing stack, then the fast path I/O request is transferred to the fast path I/O request processing circuit for processing. If the version identifier specifies an older version of the logical to physical mapping information than that which is presently utilized by the I/O request processing stack, then the fast path I/O request is transferred to the logical volume I/O request processing stack for subsequent processing.

Another aspect hereof provides a storage controller. The storage controller comprises a fast path I/O request processing circuit adapted to process a fast path I/O request directed to a device identified in fast path I/O requests and a logical volume I/O request processing stack adapted to process a logical I/O request directed to a device identified in logical I/O requests. The controller also comprises control logic coupled with the fast path I/O request processing circuit and coupled with the logical volume I/O request processing stack. The control logic is adapted to receive a fast path I/O request from an attached host system, where the request is directed to a device identified by a device identifier in the received I/O request. The request also includes an embedded version identifier that specifies a version of logical to physical mapping information utilized by the host system in generating the fast path I/O request for the device. The control logic is further adapted to determine whether the version identifier in the fast path I/O request specifies a version of logical to physical mapping information utilized by the logical volume I/O request processing stack for generating I/O operations for the device. If the version identifier specifies the version of the logical to physical mapping information utilized by the I/O request processing stack, then the control logic is further adapted to transfer the fast path I/O request to the fast path I/O request processing circuit for processing. If the version identifier specifies an older version of the logical to physical mapping information than that which is presently utilized by the I/O request processing stack, then the control logic is further adapted to transfer the fast path I/O request to the logical volume I/O request processing stack for subsequent processing.

Yet another aspect hereof provides a method operable in a storage controller comprising a logical volume I/O request processing stack implemented as software executed by the storage controller and further comprising a fast path I/O request processing circuit. According to the method, the storage controller receives a fast path I/O request from an attached host system. The request includes an embedded sequence number that specifies a version of logical to physical mapping information utilized by the host system in generating the fast path I/O request for a storage device. A determination is made whether the sequence number in the fast path I/O request specifies a version of logical to physical mapping information utilized by the logical volume I/O request processing stack for generating I/O operations for the storage device. If the sequence number specifies an older version than that which is presently utilized by the logical volume I/O request processing stack, then the method further comprises determining if the fast path I/O request may be re-formed by the I/O request processing stack.

DETAILED DESCRIPTION OF THE DRAWINGS

Figure 1:
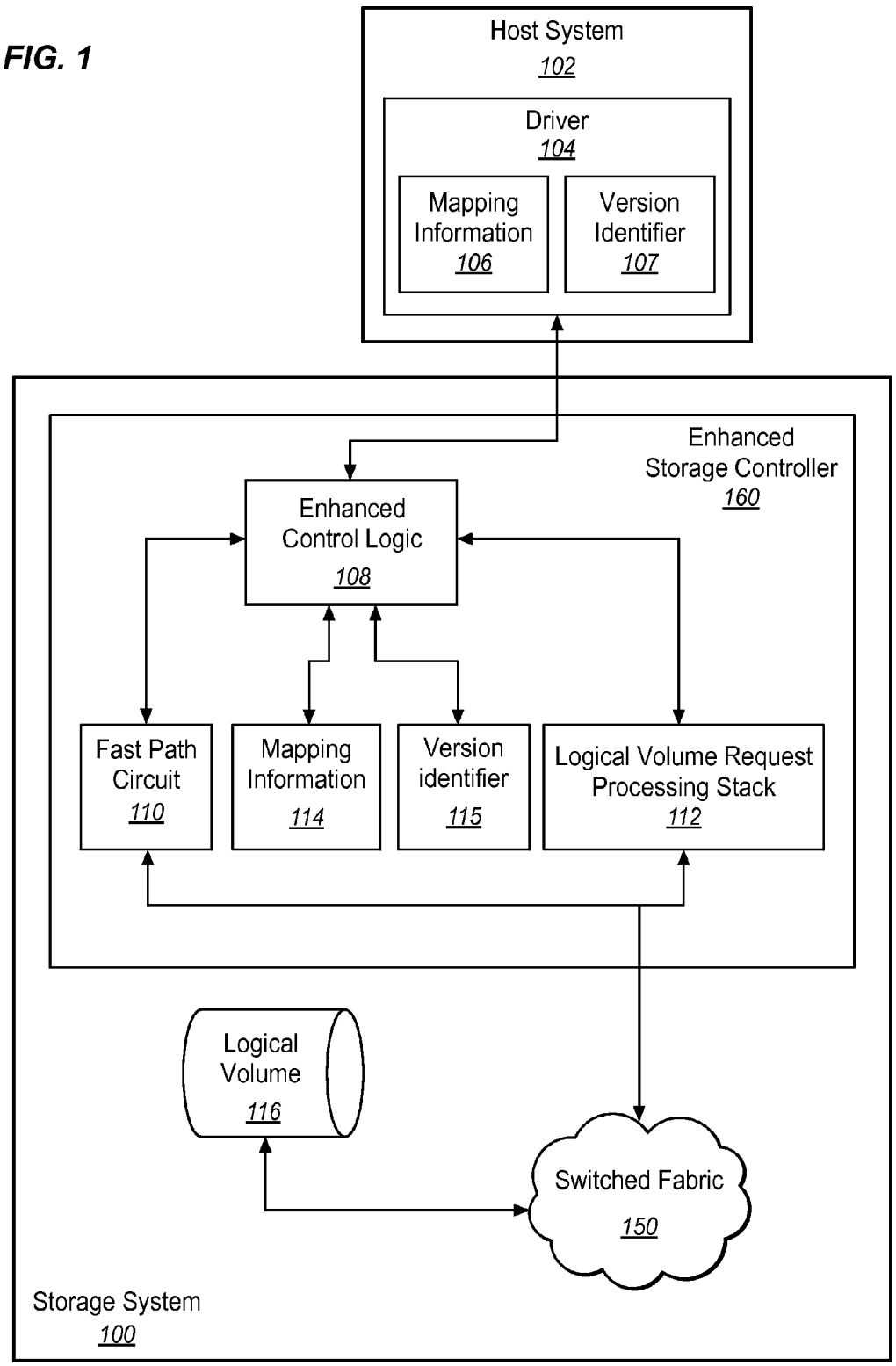
FIG. 1 is a block diagram of an exemplary storage controller enhanced in accordance with features and aspects hereof to improve processing of fast path I/O requests utilizing version information embedded in the fast path I/O requests.

FIG. 1 is a block diagram of a storage system 100 enhanced in accordance with features and aspects hereof to improve processing of fast path I/O requests utilizing version information. System 100 comprises one or more host systems 102 coupled with an enhanced storage controller 160 to access one or more logical volumes 116 through a switched fabric 150 communication medium. Host system 102 may comprise any computing device or server that generates I/O requests directed to controller 160 for access to a logical volume 116. Switched fabric 150 may be any suitable communication medium and protocol allowing coupling of controller 160 with a plurality of storage devices that provision one or more logical volumes (e.g., volume 116). Switched fabric 150 may comprise, for example, a serial attached SCSI (SAS) fabric, an Ethernet fabric, a Fibre Channel fabric, etc. Logical volume 116 is provisioned by portions of one or more storage devices (not shown). The storage devices may comprise any mix of suitable devices including optical and magnetic disk drives, solid-state drives, etc. All such storage devices of system 100 are coupled through switched fabric 150 to permit storage controller 160 to access the storage devices, and therefore, the logical volumes provisioned thereon.

Fast path I/O request processing circuit 110 may be any suitable circuit specifically designed for rapid execution of an I/O request directed to one or more specific identified physical storage devices (e.g., rather than directed to a logical volume). Utilizing mapping information 106, driver 104 of host system 102 may construct a fast path I/O request to bypass the complex processing within logical volume I/O request processing stack 112. For example, where a logical volume 116 is a RAID logical volume, the mapping information 106 may provide driver 104 with all of the information required to generate requisite RAID storage management (e.g., striping and/or redundancy information). Thus, the request may be generated as a fast path I/O request for more rapid execution by storage controller 160 by forwarding the request to fast path I/O request processing circuit 110. LSI Corporation is a supplier for exemplary fast path I/O request processing circuit 110 such as may be integrated into the LSI MegaRAID 9280 and 9285 RAID controllers. Other vendors may produce similar circuits and storage controllers comprising customized circuits for rapidly executing common I/O requests directed to specific storage devices rather than logical volumes.

Logical volume I/O request processing stack 112 generally comprises programmed instructions to be executed by an appropriate processor of controller 160 for performing requisite RAID or other logical volume storage management to access identified data. For example, RAID striping and redundancy management may be performed by logical volume I/O request processing stack 112. In some embodiments, logical volume I/O request processing stack 112 may also comprise assist circuitry to aid the programmed instructions for more rapidly performing the logical to physical mapping and/or redundancy computations required for logical volume storage management (e.g., for RAID storage management). "Stack" as used herein (with reference to stack 112) refers to a common design approach for processing of logical volume I/O request where a hierarchy of layers of management software are operable within controller 160 to process such a request. For example, in the context of an I/O request directed to a RAID logical volume, a RAID management layer of the stack may process logical to physical mapping for the addresses identified in the logical volume I/O request. A physical device management layer may manage aspects of control and status of the physical devices that comprise an addressed logical volume. Other layers may be present for error recovery, etc. Thus the entire "stack" of layers may be involved in the processing of a logical volume I/O request. Most of the layers are implemented as programmed instructions. Some or all of the layers may also utilize assist circuitry to speed up processing (i.e., RAID parity assist circuits, DMA circuits, etc.).

Mapping information 114 of controller 160 specifies the information utilized by I/O request processing stack 112 for generating I/O operations for storage devices of logical volume 116. For example, logical volume request processing stack 112 may receive a non-fast path I/O request from host system 102 that is directed to logical volume 116, and generate one or more I/O operations for storage devices that comprise logical volume 116 based on mapping information 114.

Storage controller 160 is enhanced in accordance with features and aspects hereof to process fast path I/O utilizing version information. As noted above, fast path I/O requests may be constructed by a suitable driver 104 operable within host system 102, where the fast path I/O requests are based on mapping information 106. Mapping information 106 may be stored in a memory of host system 102, and may comprise information received from storage controllers of system 100 (e.g., storage controller 160) indicative of logical to physical mapping of logical volumes to physical storage devices. A version identifier 107 is associated with mapping information 106, and identifies version information for mapping information 106.

Utilizing mapping information 106, driver 104 may construct fast path I/O requests directed to enhanced storage controller 160. The fast path I/O requests include an embedded version identifier 107. More generally, driver 104 may add "mapping context information" to a generated fast path I/O request. The mapping context information includes a version identifier derived from version identifier 107 and may further comprise other information describing the logical to physical mapping that was performed by driver 104 in constructing the fast path I/O request. A fast path I/O request is received by control logic 108 of enhanced storage controller 160. The I/O request may be identified as a fast path request by suitable indicia within the received I/O request. Control logic 108 determines if version information embedded in the fast path I/O request (by driver 104 based on its version identifier 107) specifies a current version of mapping information 114. This may be accomplished by comparing version embedded in the I/O request with version identifier 115 on controller 160, where version identifier 115 identifies a version of mapping information 114 utilized by storage controller 160. If there is a match between the version information, then the request is directed to fast path I/O request processing circuit 110 of controller 160 for rapid execution. If there is not a match between the version information, then the request may be transferred to logical volume request processing stack 112 for subsequent processing. Other requests received by control logic 108 from host system 102 that are not fast path requests (i.e., logical volume I/O requests) are directed by control logic 108 to logical volume request processing stack 112 for processing.

In operation, control logic 108 receives an I/O request from attached host system 102. The I/O request is generated by driver 104 within host system 102. Control logic 108 determines whether version information embedded by driver 104 in the fast path I/O request indicates that the correct version of mapping information 106 was used by driver 104 to generate the fast path I/O request. As discussed above, mapping information 114 may change on storage controller in response to an unplanned configuration change (e.g., a storage device associated with logical volume 116 failing, being added to the logical volume, etc.). Further, mapping information 114 on storage controller 160 may change in response to a planned configuration change (e.g., cache policy changes from write-through to/from write-back for controller 160, etc.).

Since mapping information 106 of driver 104 must be synchronized with mapping information 114 at storage controller 160, it is possible that mapping information 104 may be out of date ("stale") at the time the received fast path request was generated by driver 106. Though careful design may be employed to minimize the window of time during which host system driver 104 may have and utilize such stale mapping information, there typically remains a time window during which the driver may generate an I/O request (e.g., fast path requests) using stale mapping information.

Confronted with a fast path I/O request generated using stale mapping information, prior techniques may simply discard such a request (e.g., returning an appropriate error status to the requesting host system). By contrast, controller 160 is enhanced in accordance with features and aspects hereof to readily determine such problems utilizing version identifiers embedded in the fast path I/O requests, and to process such requests if possible. More specifically, control logic 108 determines whether a received fast path I/O request was generated using stale mapping information by inspecting version identifier information embedded in mapping context information included with the request. Further, the mapping context information may provide sufficient details to allow control logic 108 to "reverse" the logical to physical mapping process performed by driver 104 using stale mapping information to thereby reconstruct/reform an equivalent logical volume request corresponding to the received fast path I/O request but using up to date mapping information.

Mapping context information may be supplied by driver 104 embedded in the I/O request. Mapping context information may be generated by driver 104 based on mapping information 106 and version identifier 107. Such mapping context information identifies the version of mapping information used by the driver and may further provide sufficient logical to physical mapping information for control logic 108 to convert the fast path I/O request into a corresponding request directed to an identified logical volume. For example, the mapping context information may comprise relevant portions of the logical to physical mapping information utilized by driver 104 to enable control logic 108 to "reverse" the mapping process of driver 104 so as to generate a corresponding logical volume I/O request based on the fast path I/O request directed to a specific one or more storage devices.

Mapping context information may be embedded within an I/O request in any suitable manner. In some exemplary embodiments, an I/O request may comprise a structured message that includes a number of fields and substructures. For example, a basic SCSI command descriptor block (CDB) may be included in the I/O request structure. Where DMA capabilities are utilized to exchange data associated with a request between the memory of the requesting host and the storage controller receiving the request, the I/O request structure may comprise scatter-gather list information for operation of the DMA features of the storage controller. Still further, with respect to features and aspects hereof, the I/O request structure may comprise a mapping information substructure.

The following exemplary pseudo-code structures suggest an exemplary structure for an I/O request that includes embedded mapping context information. It will be readily recognized that in many embodiments, significant additional information will be useful in such an I/O request structure. Such additional information is unrelated to features and aspects hereof and thus are omitted herein for simplicity and brevity of this discussion.

```
typedef struct _IO_REQUEST
{
    U16             DevHandle;       /* A device identifier to which
                                        the request is directed */
    SCSI_IO_CDB_UNION CDB;           /* The SCSI CDB describing
                                        the operation to be
                                        performed */
    MAPPING_CONTEXT_INFO CTX;        /* Mapping information */
    SG_UNION        SGL;             /* DMA scatter-gather list */
} IO_REQUEST
typedef struct _MAPPING_CONTEXT_INFO {
    REG_LOCK_STRUCT regLockInfo;    /* Region lock information *
    U16             ldTargetId;      /* Target ID of logical
                                        volume */
    U8              RAIDFlags;       /* RAID management
                                        level */
    U16             configSeqNum;    /* Version identifier of mapping info
                                        used */
    ...
} MAPPING_CONTEXT_INFO
```

Control logic 108 is further operable to synchronize updated mapping information stored in its mapping memory 114 with the mapping information 106 utilized within host system 102. Responsive to sensing a change in the mapping information for one or more logical volumes of a clustered storage system (and/or a change of ownership information), control logic 108 distributes up to date mapping information to driver 104 of host system 102. Control logic 108 may be further operable to convert other previously received (i.e., queued for processing) fast path I/O requests or previously received (i.e., queued for processing) logical volume I/O requests into converted logical volume I/O requests. For example, where previously received requests are queued within controller 160 for eventual execution by either fast path circuit 110, the queued request if generated with a stale version of mapping context information may be reformed/reconstructed using up to date mapping information of controller 160.

Those of ordinary skill in the art will readily recognize numerous equivalent and additional elements that may be present in a fully functional storage controller. Such equivalent and additional elements are omitted herein for simplicity and brevity of this discussion.

Figure 2:
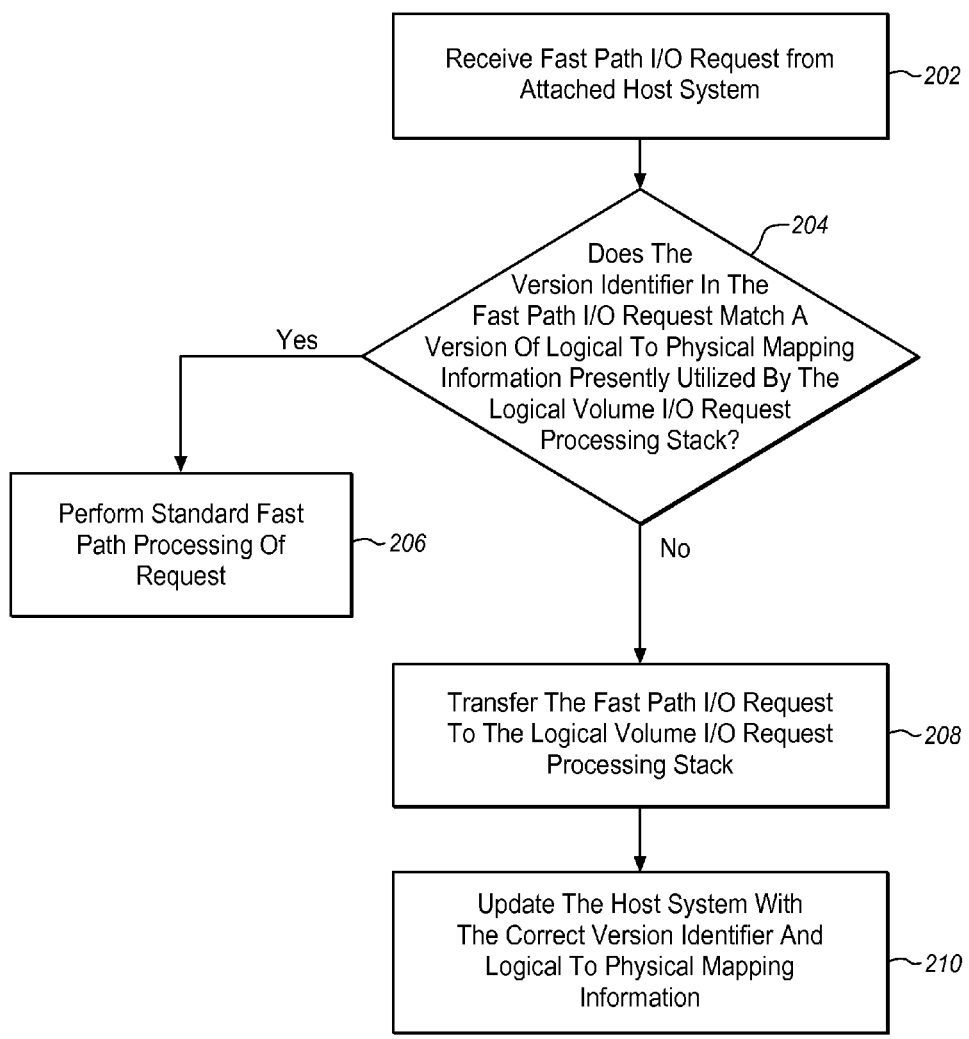
FIGS. 2 through 4 are flowcharts describing exemplary methods operable in a storage controller such as illustrated in FIG. 1 for improved processing of fast path I/O requests utilizing version information embedded in the fast path I/O requests.

FIG. 2 is a flowchart describing an exemplary method in accordance with features and aspects hereof for improved processing of fast path I/O requests utilizing embedded version information (e.g., embedded in the fast path I/O requests). The method of FIG. 2 may be operable in an enhanced storage system such as the system 100 of FIG. 1 and, more specifically, may be operable in control logic 108 of controller 160 of FIG. 1. At step 202 a fast path I/O request is received from an attached host system. Step 204 next determines whether the version identifier embedded in the fast path I/O request specifies a version of the logical to physical mapping information utilized by the logical volume I/O request processing stack. If the version identifier indicates that the versions match, then step 204 represents standard processing by the controller to process the request for the device identified in the fast path I/O request. The standard processing comprises forwarding the request to the fast path I/O request processing circuit.

If the version identifier embedded in the fast path I/O request specifies and older version of the logical to physical mapping information than that which is presently utilized by the logical volume I/O request processing stack, then step 208 represents transferring the fast path I/O request to the logical volume I/O request processing stack for subsequent processing. Subsequent processing may include converting (translating) the fast path I/O requests based on the mapping information used to generate the fast path I/O request (as indicated by the version identifier) to correspond with the mapping information as known to the logical volume I/O request processing stack. For example, the logical volume I/O request processing stack may be able to back out the individual fast path device I/O request(s) to generate a logical volume I/O request based on the out of date mapping information identified in the version identifier, and then re-generate I/O operations for storage devices based on the correct mapping information as known to the logical volume I/O request processing stack. In some embodiments, step 210 is performed whereby the host system is updated with the correct version identifier and the logical to physical mapping information as known to the logical volume I/O request processing stack. This allows the host system to correctly generate subsequent fast path I/O requests utilizing the up to date mapping information.

Figure 3:
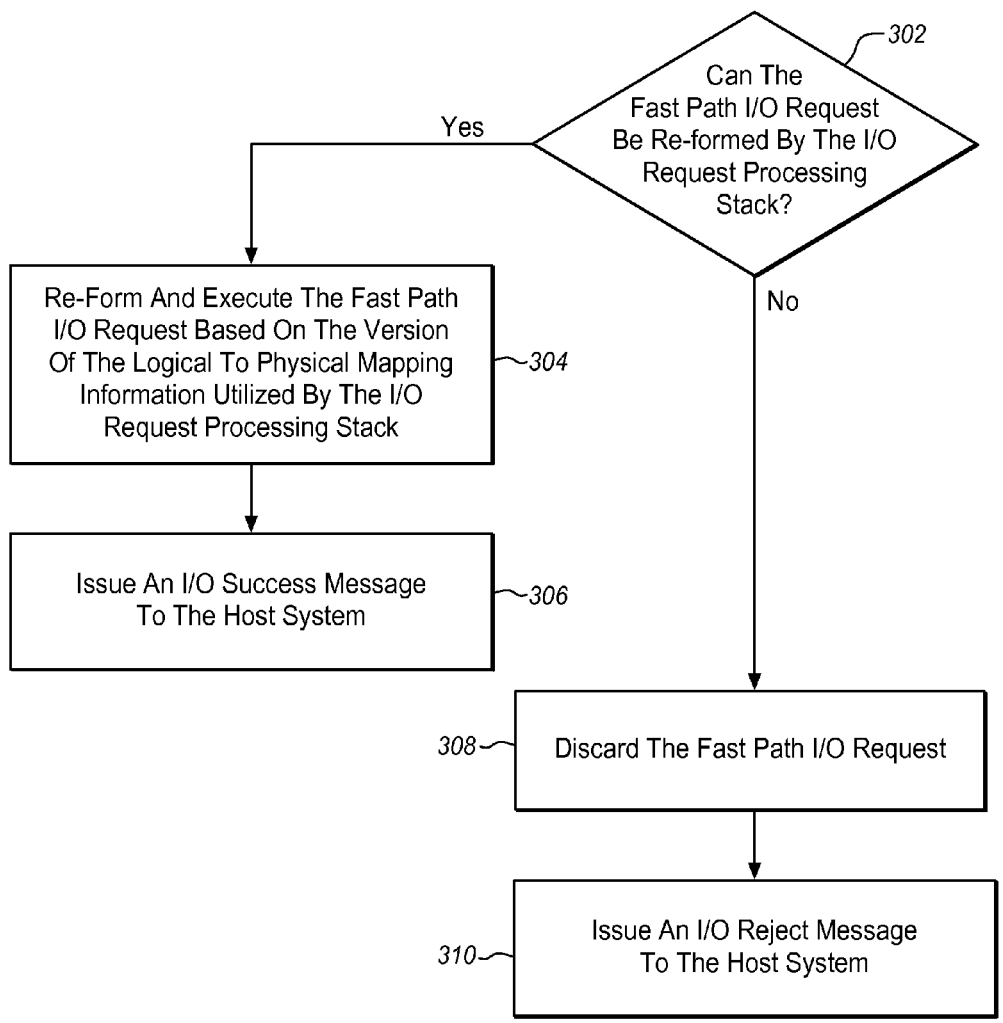

FIG. 3 is a flowchart describing exemplary additional steps for the method of FIG. 2 for improved processing of fast path I/O requests utilizing embedded version information (e.g., embedded in the fast path I/O requests) in accordance with features and aspects hereof. The method of FIG. 3 may be operable in an enhanced storage system such as system 100 of FIG. 1 and more specifically may be operable within enhanced control logic 108 of enhanced storage controller 160 of FIG. 1. Step 302 determines if the fast path I/O request can be re-formed by the I/O request processing stack of the storage controller. This may be determined by, for example, comparing the difference between the mapping information utilized by the host system in generating the fast path I/O request with the mapping information as currently known by the I/O request processing stack. If the request can be re-formed, step 304 re-forms and executes the fast path I/O request based on the version of the logical to physical mapping information utilized by the I/O request processing stack. Step 306 issues an I/O success message to the host system that indicates that the fast path I/O request has been successfully processed by the storage controller. If the request cannot be re-formed, then step 308 discards the fast path I/O request. The controller may not be able to re-form the I/O request if insufficient information is available to the controller to re-map the out of date I/O requests generated by the host system to comply with the current mapping information utilized by the I/O request processing stack. Step 310 issues an I/O reject message to the host system that indicates that the fast path I/O request has not been successfully processed by the storage controller when re-forming the fast path I/O request is not possible.

Figure 4:
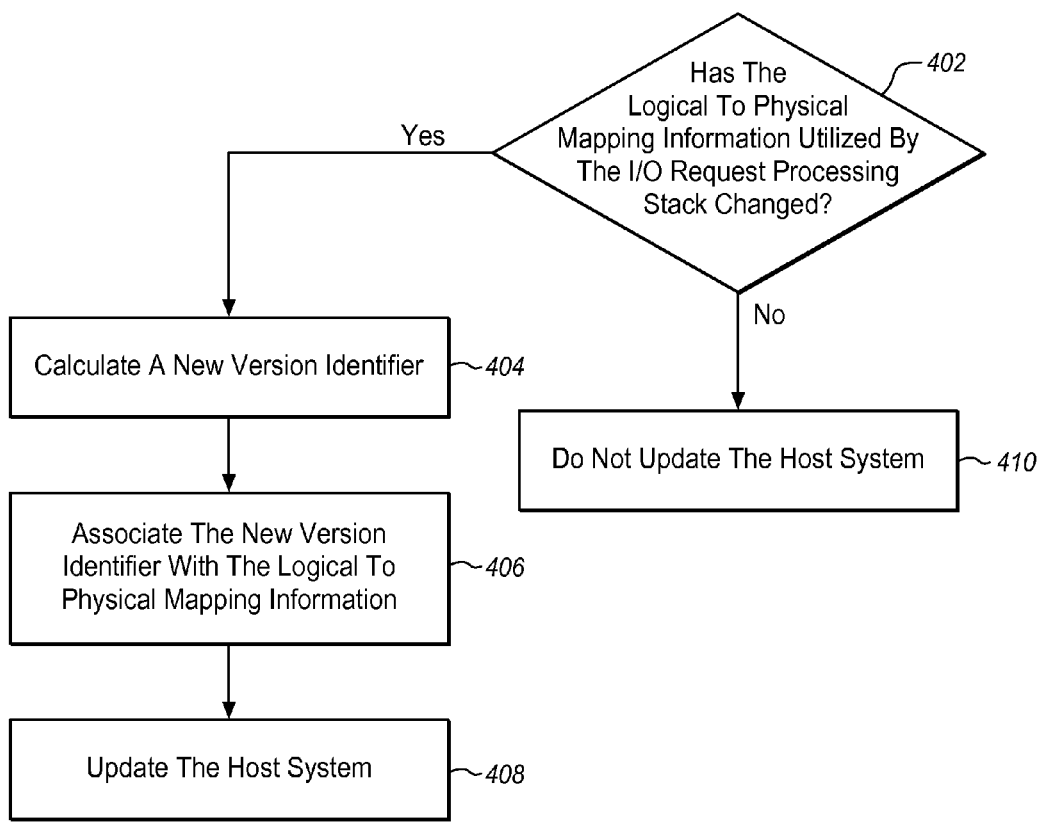

FIG. 4 is flowchart describing exemplary additional steps for the method of FIG. 2 for improved processing of fast path I/O requests utilizing embedded version information in accordance with features and aspects hereof. The method of FIG. 4 may be operable in an enhanced storage system such as system 100 of FIG. 1 and more specifically may be operable in enhanced control logic 108 of enhanced storage controller 160 of FIG. 1. Step 402 determines if the logical to physical mapping information utilized by the I/O request processing stack has changed. Some examples of mapping information changing include failed storage devices, changes to cache modes at the controller, etc. For example, if the controller cache state changes from write through to write back, then the storage devices may not store up to date information until the cache is flushed to the storage devices. In the example, fast path I/O requests may incorrectly read data from the storage devices as opposed to reading data from a cache on the controller. This may return incorrect information to the host system. If no change has occurred in the mapping information at the storage controller, then the host system is not updated (as per step 410). If the mapping information has changed, then step 404 calculates a new version identifier or sequence number for the updated mapping information. For example, the version identifier/sequence number may be incremented as the mapping information changes at the storage controller. Step 406 then associates the new version identifier/sequence number with the updated mapping information. Step 408 then updates the host system with the new version identifier/sequence number and the updated mapping information.

Those of ordinary skill in the art will readily recognize numerous additional and equivalent steps and fully functional methods such as those described above with respect to FIGS. 2 through 4. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a storage controller comprising a logical volume I/O request processing stack implemented as software executed by the storage controller and further comprising a fast path I/O request processing circuit, the method comprising:
    receiving in the storage controller a fast path I/O request from an attached host system, wherein the request is directed to a device identified by a device identifier in the received I/O request, and wherein the request includes a version identifier that specifies a version of logical to physical mapping information utilized by the host system in generating the fast path I/O request for the device;
    determining whether the version identifier in the fast path I/O request specifies a version of logical to physical mapping information that is presently utilized by the logical volume I/O request processing stack for generating I/O operations for the device;
    responsive to determining that the version identifier specifies the version of the logical to physical mapping information that is presently utilized by the I/O request processing stack, processing the fast path I/O request by operation of the fast path I/O request processing circuit of the storage controller; and
    responsive to determining that the version identifier specifies an older version of the logical to physical mapping information than that which is presently utilized by the request processing stack, transferring the fast path I/O request to the logical volume I/O request processing stack for subsequent processing.

2. The method of claim 1 further comprising:
    responsive to determining that the version identifier specifies an older version of the logical to physical mapping information than that which is presently utilized by the I/O request processing stack, updating the host system with the version of the logical to physical mapping information utilized by the I/O request processing stack.

3. The method of claim 1 further comprising:
    responsive to determining that the version of the logical to physical mapping information utilized by the I/O request processing stack has changed, performing additional steps of:
    calculating a new version identifier;
    associating the new version identifier with the changed logical to physical mapping information utilized by the I/O request processing stack; and
    updating the host system with the new version identifier and the changed logical to physical mapping information utilized by the I/O request processing stack.

4. The method of claim 1 further comprising:
    responsive to determining that the version identifier specifies an older version of the logical to physical mapping information than that which is presently utilized by the I/O request processing stack, determining if the fast path I/O request may be re-formed by the I/O request processing stack based on the version of the logical to physical mapping information presently utilized by the I/O request processing stack.

5. The method of claim 4 further comprising:
    responsive to determining that the fast path I/O request may not be re-formed by the I/O request processing stack, performing additional steps of:
    discarding the fast path I/O request; and issuing an I/O error message to the host system for the fast path I/O request.

6. The method of claim 4 further comprising:
responsive to determining that the fast path I/O request may be re-formed by the I/O request processing stack, performing additional steps of:
re-forming the fast path I/O request based on the version of the logical to physical mapping information utilized by the I/O request processing stack; and
issuing an I/O success message to the host system for the fast path I/O request.

7. A storage controller comprising:
a fast path I/O request processing circuit adapted to process a fast path I/O request directed to a device identified in the fast path I/O request;
a logical volume I/O request processing stack adapted to process a logical I/O request directed to a device identified in the logical I/O request;
control logic coupled with the fast path I/O request processing circuit and coupled with the logical volume I/O request processing stack, the control logic adapted to receive a fast path I/O request from an attached host system, wherein the request is directed to a device identified by a device identifier in the received I/O request, and wherein the I/O request includes an embedded version identifier that specifies a version of logical to physical mapping information utilized by the host system in generating the fast path I/O request for the device,
the control logic further adapted to determine whether the version identifier in the fast path I/O request specifies a version of logical to physical mapping information that is presently utilized by the logical volume I/O request processing stack for generating I/O operations for the device,
the control logic, responsive to determining that the version identifier specifies the version of the logical to physical mapping information utilized by the I/O request processing stack, is further adapted to transfer the fast path I/O request to the fast path I/O request processing circuit for processing,
the control logic, responsive to determining that the version identifier specifies an older version of the logical to physical mapping information than that which is presently utilized by the I/O request processing stack, is further adapted to transfer the fast path I/O request to the logical volume I/O request processing stack for subsequent processing.

8. The controller of claim 7 wherein:
the control logic, responsive to determining that the version identifier specifies an older version of the logical to physical mapping information than that which is presently utilized by the I/O request processing stack, is further adapted to update the host system with the version of the logical to physical mapping information utilized by the I/O request processing stack.

9. The controller of claim 7 wherein:
the control logic, responsive to determining that the version of the logical to physical mapping information utilized by the I/O request processing stack has changed, is further adapted to:
calculate a new version identifier,
associate the new version identifier with the changed version of the I/O request processing stack, and
update the host system with the new version identifier and the changed logical to physical mapping information utilized by the I/O request processing stack.

10. The controller of claim 7 wherein:
the control logic, responsive to determining that the version identifier specifies and older version of the logical to physical mapping information than that which is presently utilized by the I/O request processing stack, is further adapted to determine if the fast path I/O request may be re-formed by the I/O request processing stack based on the version of the logical to physical mapping information utilized by the I/O request processing stack.

11. The controller of claim 10 wherein:
the control logic, responsive to determining that the fast path I/O request may not be re-formed by the I/O request processing stack, is further operable to:
discard the fast path I/O request, and
issue an I/O error message to the host system for the fast path I/O request.

12. The controller of claim 10 wherein:
the control logic, responsive to determining that the fast path I/O request may be re-formed by the I/O request processing stack, is further operable to:
re-form the fast path I/O request based on the version of the logical to physical mapping information utilized by the I/O request processing stack, and
issue an I/O success message to the host system for the fast path I/O request.

13. A method operable in a storage controller comprising a logical volume I/O request processing stack implemented as software executed by the storage controller and further comprising a fast path I/O request processing circuit, the method comprising:
receiving in the storage controller a fast path I/O request from an attached host system, wherein the request includes a sequence number that specifies a version of logical to physical mapping information utilized by the host system in generating the fast path I/O request for a storage device;
determining whether the sequence number in the fast path I/O request specifies a version of logical to physical mapping information that is presently utilized by the logical volume I/O request processing stack for generating I/O operations for the device; and
responsive to determining that the sequence number in the fast path I/O request specifies an older version of the logical to physical mapping information than that which is presently utilized by the I/O request processing stack, determining if the fast path I/O request may be re-formed by the I/O request processing stack.

14. The method of claim 13 further comprising:
responsive to determining that the fast path I/O request may not be re-formed by the I/O request processing stack, discarding the fast path I/O request.

15. The method of claim 13 further comprising:
responsive to determining that the fast path I/O request may not be re-formed by the I/O request processing stack, issuing an I/O error message to the host system indicating that the fast path I/O request is rejected by the storage controller.

16. The method of claim 13 further comprising:
responsive to determining that the sequence number in the fast path I/O request specifies an older version of the logical to physical mapping information than that which is presently utilized by the I/O request processing stack, updating the logical to physical mapping information utilized by the host system to correspond to the logical to physical mapping information presently utilized by the I/O request processing stack.

17. The method of claim 16 further comprising:
responsive to determining that the sequence number in the fast path I/O request specifies an older version of the logical to physical mapping information than that which is presently utilized by the I/O request processing stack, updating the sequence number utilized by the host system in generating subsequent fast path I/O requests.

18. The method of claim 13 further comprising:
responsive to determining that the fast path I/O request may be re-formed by the I/O request processing stack, re-forming the fast path I/O request based on the version of the logical to physical mapping information utilized by the I/O request processing stack.

19. The method of claim 13 further comprising:
responsive to determining that the version of the logical to physical mapping information utilized by the I/O request processing stack has changed, performing additional steps of:

calculating a new sequence number;

associating the new sequence number with the changed version of the logical to physical mapping information utilized by the I/O request processing stack; and updating the host system with the new sequence number and the changed logical to physical mapping information utilized by the I/O request processing stack to allow the host system to generate new fast path I/O requests based on the update.

\* \* \* \* \*